United States Patent [19]

Canat et al.

[11] Patent Number: 5,002,722
[45] Date of Patent: Mar. 26, 1991

[54] NUCLEAR FUEL ASSEMBLY WITH COOLANT FLOW FRACTIONATION

[75] Inventors: Jean-Noël Canat, Lyon; Joöl Pla, Villeurbanne, both of France

[73] Assignees: Framatome, Courbevoie; Compagnie Generale des Matieres Nucléaires, Velizy Villacoublay, both of France

[21] Appl. No.: 242,003

[22] Filed: Sep. 8, 1988

[30] Foreign Application Priority Data

Sep. 11, 1987 [FR] France ................. 87 12623

[51] Int. Cl.⁵ .................. G21C 15/00; G21C 3/32
[52] U.S. Cl. .................... 376/353; 376/443; 376/444; 376/446; 376/449
[58] Field of Search ............ 376/353, 327, 449, 443, 376/444, 434, 446

[56] References Cited

U.S. PATENT DOCUMENTS

| | | | |
|---|---|---|---|
| 3,481,832 | 12/1969 | Rickert | 376/353 |
| 4,135,971 | 1/1979 | Calvin | 376/353 |
| 4,292,132 | 9/1981 | Schukei et al. | 376/327 |
| 4,313,496 | 2/1982 | Bueffiker | 376/353 |
| 4,522,782 | 6/1985 | Leclercq | 376/449 |
| 4,534,933 | 8/1985 | Gjertsen et al. | 376/353 |
| 4,681,728 | 7/1987 | Veronesi et al. | 376/353 |
| 4,687,628 | 8/1987 | Gillett et al. | 376/353 |
| 4,693,862 | 9/1987 | Tower et al. | 376/209 |
| 4,707,326 | 11/1987 | Wilson et al. | 376/353 |
| 4,716,016 | 12/1987 | Demario et al. | 376/353 |
| 4,762,661 | 8/1988 | Leclercq et al. | 376/446 |
| 4,828,792 | 5/1989 | Leclercq et al. | 376/364 |
| 4,842,815 | 6/1989 | Cauquelin et al. | 376/353 |

FOREIGN PATENT DOCUMENTS 2589614  5/1987  France .

*Primary Examiner*—Harvey E. Behrend
*Attorney, Agent, or Firm*—Pollock, Vande Sande & Priddy

[57] ABSTRACT

A fuel assembly for a light water cooled and moderated nuclear reactor comprises a bundle of fuel rods and a structure for holding the bundle in position comprising upper and lower end pieces or nozzles joined together by guide tubes which support grids for maintaining the fuel rods at the nodal points of a regular array. The upper end piece comprises an adapter plate fixed to some at least of the guide tubes and having an upwardly directed shroud arranged to bear directly or indirectly on the upper core plate of the reactor and encircling a coolant passage defining an internal volume into which all guide tubes open. The adapter plate has coolant passages around the shroud. This arrangement makes it possible to direct an adjustable fraction of the cooling water flow outwardly of a cluster guide sleeve associated with the assembly and belonging to the upper internals of the reactor.

10 Claims, 4 Drawing Sheets

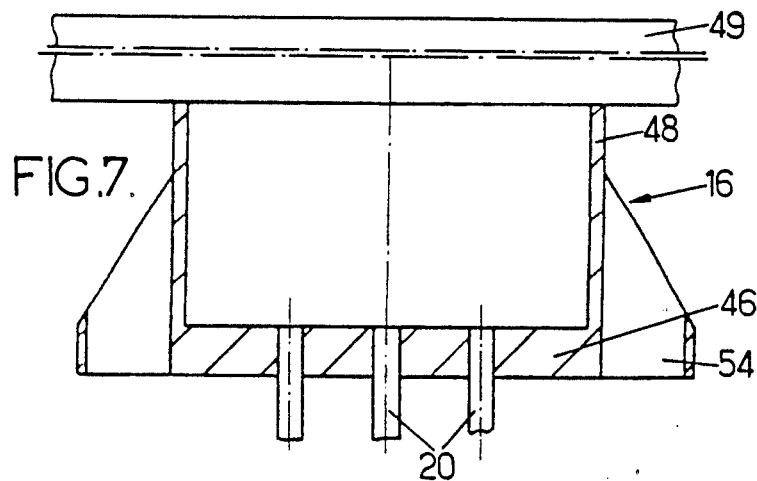
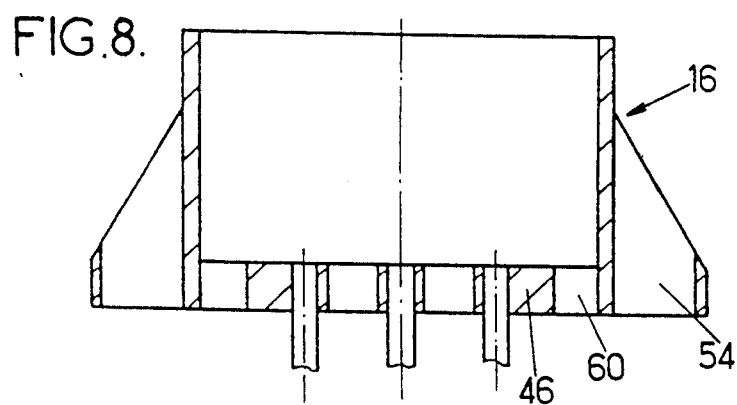
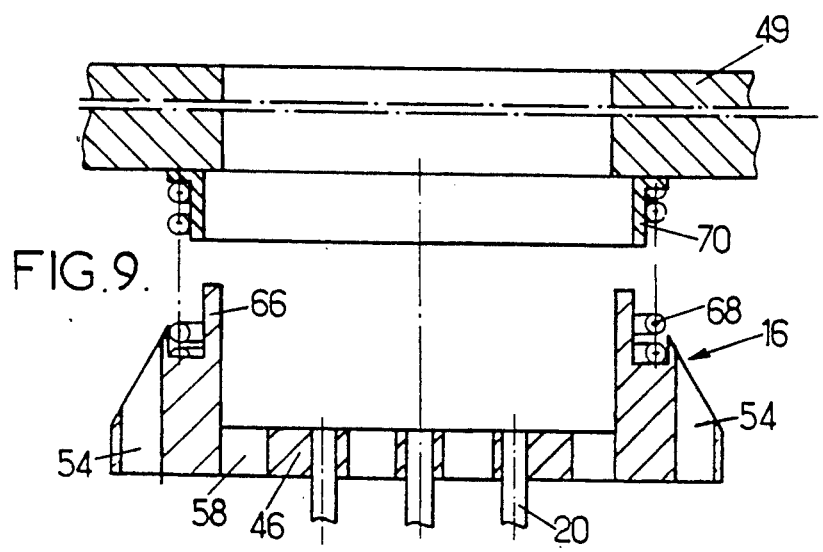

NUCLEAR FUEL ASSEMBLY WITH COOLANT FLOW FRACTIONATION

BACKGROUND OF THE INVENTION

1. Technical Field

The invention relates to fuel assemblies for a nuclear reactor cooled and moderated by an upward coolant flow and is particularly, although not exclusively, suitable for use in light water cooled and moderated reactors.

2. Prior Art

A nuclear reactor core is generally formed of fuel assemblies, of hexagonal or square cross-section, supported by a core support plate.

Most presently used fuel assemblies are of the type comprising a bundle of fuel rods (this term designating loaded with fissile material and/or fertile material) and a structure for holding the bundle in position, comprising upper and lower end pieces or nozzles joined together by guide tubes which support grids for maintaining the fuel rods at the nodal points of a regular array; most of them comprise resilient means for transmitting the force impressed on the assembly by the upward coolant flow.

The upper end piece fulfils several mechanical and hydraulic functions. It makes it possible to handle the assembly. It cooperates with an upper core plate which defines the core for fixing the level of the assembly. The upper end piece is also formed with openings for elongated elements insertable in guide tubes and forming clusters; these clusters may be placed permanently (plugs or neutron source clusters) or they may be movable during operation (neutron absorbing or spectrum variation clusters). Substantially the entire upward flow through the assembly between the fuel rods and possibly within and along the guide tubes is collected by the upper end piece.

The upper core plate placed above the assemblies has openings for discharging the coolant. The upper core plate constitutes, with cluster guide sleeves and spacer columns connected to an additional plate, upper internals of the reactor.

In present light water cooled and moderated reactors, the coolant outlet openings formed in the upper end piece are so arranged that substantially the entire flow leaving an assembly receiving a cluster is directed toward the guide sleeve of the cluster. Such arrangements are disclosed in French No. 2,000,399 (Westinghouse), corresponding to U.S. Pat. No. 4,231,843, and in European No. 0,079,828 (Framatome et Cie), to which reference may be made for a general description of the assembly.

In some cases, in this arrangement the flow rate within the cluster guide sleeves is so large or the coolant speed is so high that it induces intense vibrations of the rods of the clusters.

SUMMARY OF THE INVENTION

It is an object of the present invention to provide an improved fuel assembly of the above-defined type; it is a more specific object to provide a fuel assembly making it possible to adjust the flow within and along the cluster guide sleeves at will; it is a further object to provide an improved fuel assembly-upper internals configuration, For this purpose, there is provided a fuel assembly wherein the upper end piece comprises an adapter plate fixed to some at least of the guide tubes and having an upwardly directed shroud arranged to bear directly or indirectly on the upper core plate and encircling a coolant passage defining an internal volume into which all guide tubes open, and wherein the adapter plate has coolant passages around the shroud.

This arrangement makes it possible to direct an adjustable fraction of the coolant flow outwardly of the cluster guide sleeve associated with the assembly. The adapter plate may even be devoid of passages opening into the internal volume so that the guide sleeves receive only the coolant which has flowed inside the guide tubes. When passages opening into the internal volume are formed in the adapter plate, they are so disposed that they prevent fuel rods from being blown up through them.

The coolant flow which leaves the fuel assembly through the passages formed around the shroud passes into the upper internals through openings formed in the upper core plate between the sleeves.

While the invention is applicable to fuel assemblies whose structure or holding frame constitutes a unitary skeleton which abuts the upper core plate (or a core support plate) through resilient means, it is also adaptable to fuel assemblies in which the structure is formed of two sub-structures vertically movable with respect to each other. Such assemblies with two substructures are described in French No. 2,589,614, to which reference may be made.

BRIEF DESCRIPTION OF THE DRAWINGS

The invention will be better understood from the following description of particular embodiments given by way of examples. The description refers to the accompanying drawings, in which

FIGS. 7 and 8 are schematic views of an upper end piece of a one-piece fuel assembly structure applied against the upper core plate, according to two modifications, in cross-section through planes passing through the axis of the assemblies; and FIG. 9, similar to FIGS. 2 and 3, shows the upper end piece of an assembly having a unitary structure, resiliently biased against the upper core plate, in accordance with yet an other embodiment of the invention.

DETAILED DESCRIPTION OF PREFERRED EMBODIMENTS

Figure 1:
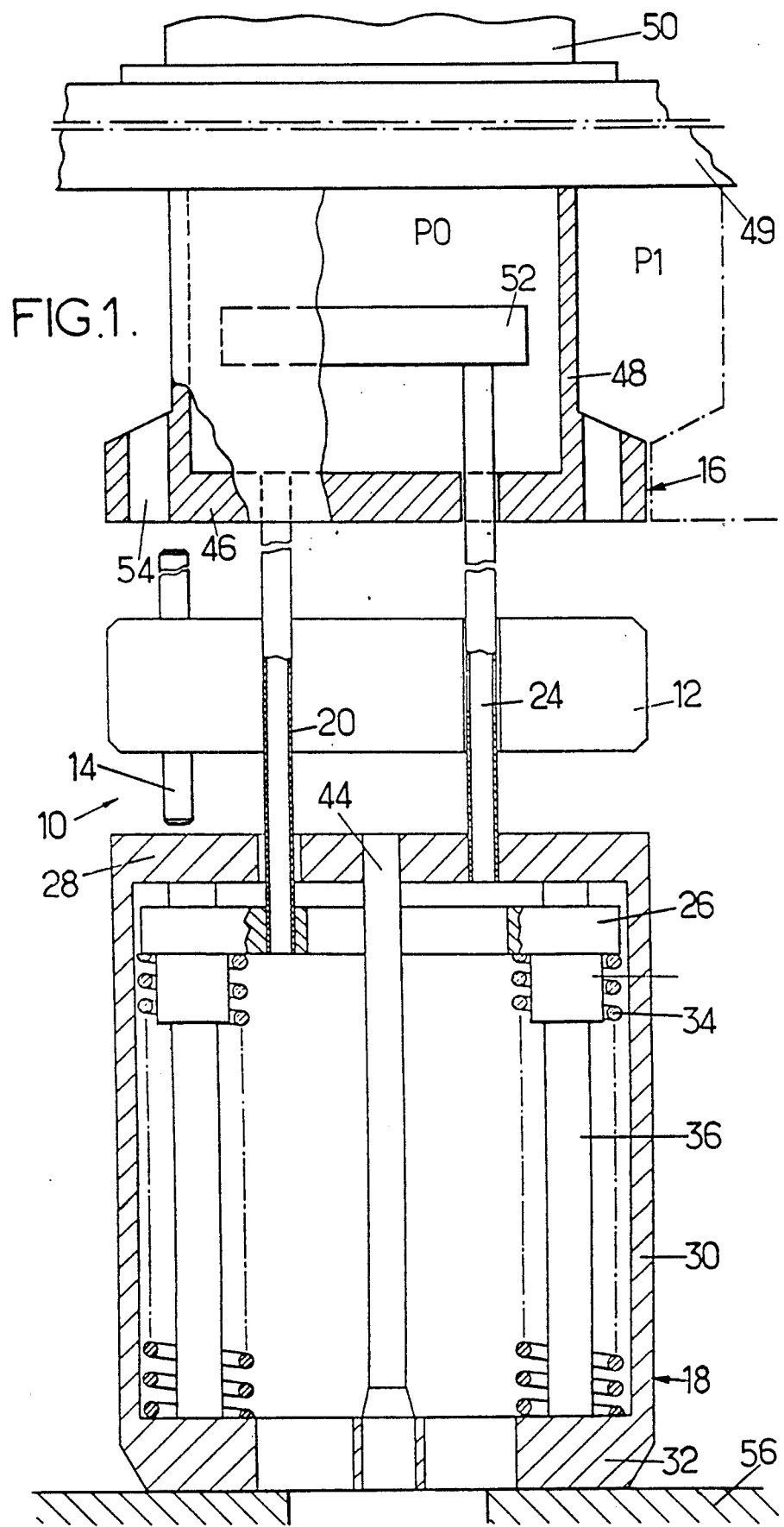
FIG. 1 is a schematic view showing the main elements of the structure of an assembly constituting a first embodiment of the invention, comprising two sub-structures, and the core plates with which it cooperates.

As shown in FIG. 1, a fuel assembly 10 comprises a support structure having an upper end piece 16, a lower end piece 18 and guide tubes which connect the other elements of the support structure and which carry grids 12 for supporting and spacing the rods 14, one only of which is shown.

The structure consists of two sub-structures. The first sub-structure comprises the upper end piece 16 and those guide tubes 20 which belong to a first group and which are secured to grids 12 and to the upper end piece 16. The second sub-structure comprises the balance of the guide tubes 24, forming a second group, slidably received in the upper end piece 16 and in the grids 12 and rigidly connected to the lower end piece 18.

The lower end piece 18 forms a cage, shown as a unitary piece in FIG. 1, but in fact made up of several mutually secured components; the end piece 18 has a bottom wall 28 fixed rigidly to the guide tubes 24 and a side wall 30 joining the bottom wall 28 to a frame 32 defining a wide inlet passage for the coolant entering the cage. The lower end piece 18 accommodates a vertically movable plate 26 fixed to the guide tubes 20 and consequently belonging to the first sub-structure.

Resilient means contained within the cage 30 and protected thereby are provided for vertically biasing frame 32 and plate 26 apart. As shown, the resilient means comprises a plurality of helical springs interposed between frame 32 and plate 26. In the case of an assembly where the fuel elements are distributed in a triangular array and whose end pieces have a hexagonal cross-section, six springs 34 are typically provided, each in one of the corners of the side wall 30. Each spring 34 is mounted on a guide shaft 36 which connects the bottom wall 28 to the frame 32. As shown in FIG. 1, frame 32 and bottom wall 28 are also connected together by an axial extension tube 44 situated in alignment with an instrumentation tube (not shown).

The upper end piece 16 comprises an adapter plate 46 fixed to the guide tubes 20 and a shroud 48, directed upwardly and arranged to bear on the upper core plate 49 around a passage (not shown) for delivery of coolant into the respective guide sleeve 50. Plate 46 is unitary with shroud 48 or fixed rigidly thereto. For the sake of clarity, only a single guide tube 20 and a single guide tube 24 have been shown in FIG. 1. In fact, a plurality of guide tubes of each type are distributed in the array of fuel rods 1,4. Shroud 48 has a horizontal cross-section so sized and shaped that it encircles all guide tubes 20 and 24 which consequently open into an inner volume defined by the shroud 48 and adapter plate 46. The ends of all guide tubes 24 are fixed to a connection plate 52 which is vertically movable within and along the upper end piece 16; the guide tubes 24 may extend through plate 52.

Figure 2:
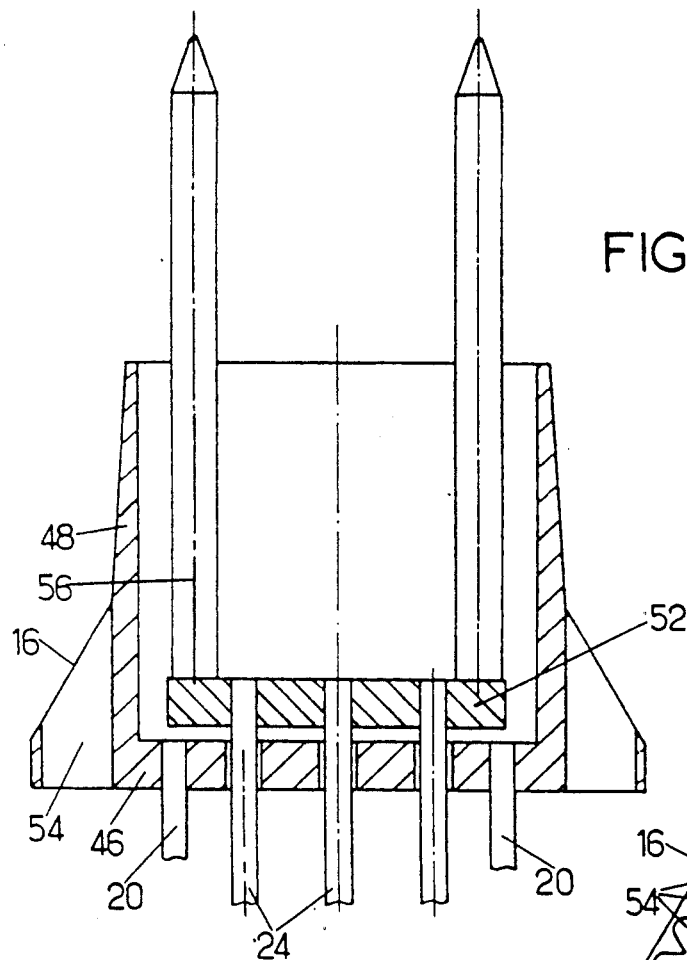
FIGS. 2 and 3 show schematically, respectively in cross-section through a vertical mid-plane and in the plan view, an upper end piece forming a modification of that shown in FIG. 1.

In the embodiments shown in FIGS. 1 and 2, there is no passage formed in the adapter plate 46 and opening into the inner volume. Consequently, only the upward coolant flow through the guide tubes 20 and 24 emerges into the inner volume and passes from there into the sleeve 50 through the passages formed in the upper core plate 49. On the other hand, passages 54 are formed in plate 46 around shroud 48 and open into the space situated between upper end pieces of adjacent assemblies.

This arrangement makes it possible to uncouple the pressure P1 which prevails outside the shrouds 48 from the pressure P0 which prevails inside the inner volume. When the assembly is in position in a reactor core and rests on the core support plate 56, the movable plate 26, forced upwardly by springs 34, drives the whole first sub-structure and the fuel rods 14 upwardly to a position where shroud 48 bears against the upper core plate 49.

Plate 52 may be arranged to receive the spider of a cluster associated with the assembly upon cluster fall, and thereby does not transmit the impact force to the adapter plate 46. This prevents the upper end piece 16 from being thrown out of contact with upper core plate 49, and a leak flow occurs between shroud 48 and plate 49 during transients.

It should also be noted that the construction shown in FIG. 1 places the internal volume of shroud 48 in communication with the colder water volume under the cover of the reactor vessel. If depressurization of the core occurs, pressure P0 becomes greater than pressure P1 (which is also the pressure which prevails in the upper part of the assemblies) and exerts a hydraulic thrust which forces back the first substructure and causes "cold" water to pour over the assemblies.

Figure 3:
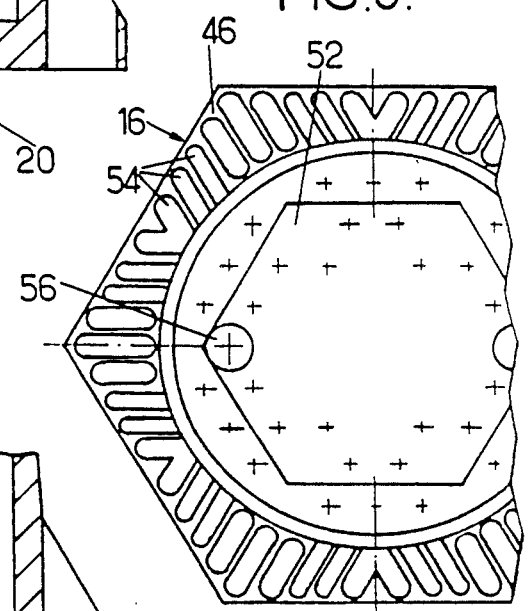

In the embodiment shown in FIGS. 2 and 3 (where the members corresponding to those in FIG. 1 are designated by the same reference numbers), the guide tubes 20 of the first sub-structure are disposed as a circular row around the guide tubes 24, making it possible to reduce the transverse size of plate 52. As shown, plate 52 is provided with centering and indexing studs 56 engaging into corresponding recesses (not shown) in the upper core plate.

Figure 4:
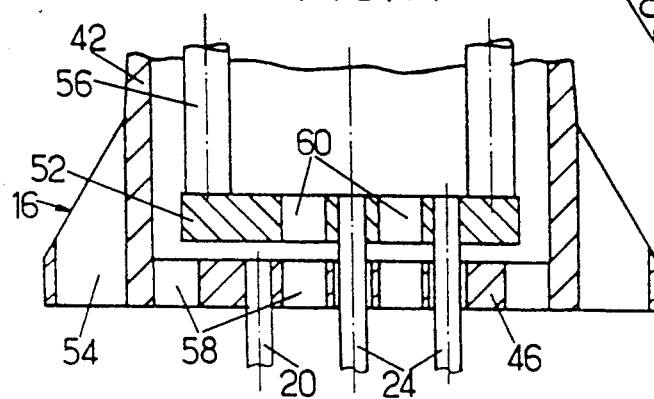
FIG. 4; similar to FIG. 2, shows the upper end piece of an assembly with two sub-structures whose adapter plate is formed with passages for directing a coolant flow toward the guide sleeve.

In the modification shown in FIG. 4, passages 58 opening into the inner volume are formed within and across the adapter plate 46. Corresponding passages 60 are formed in plate 52. Coolant flow distribution between the guide sleeve and the outside is selected at will by proper dimensions of the flow cross-sectional area offered by passages 54 and 58.

Figure 5:
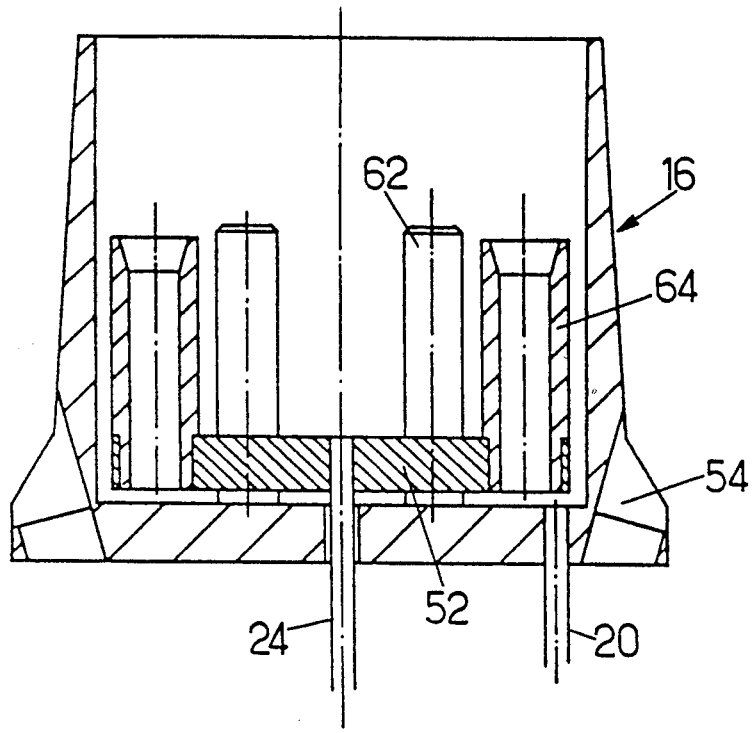
FIGS. 5 and 6 show, respectively in cross-section through a vertical plane and in top plan view, a possible construction of an upper end piece of an assembly according to FIG. 1.
Figure 6:
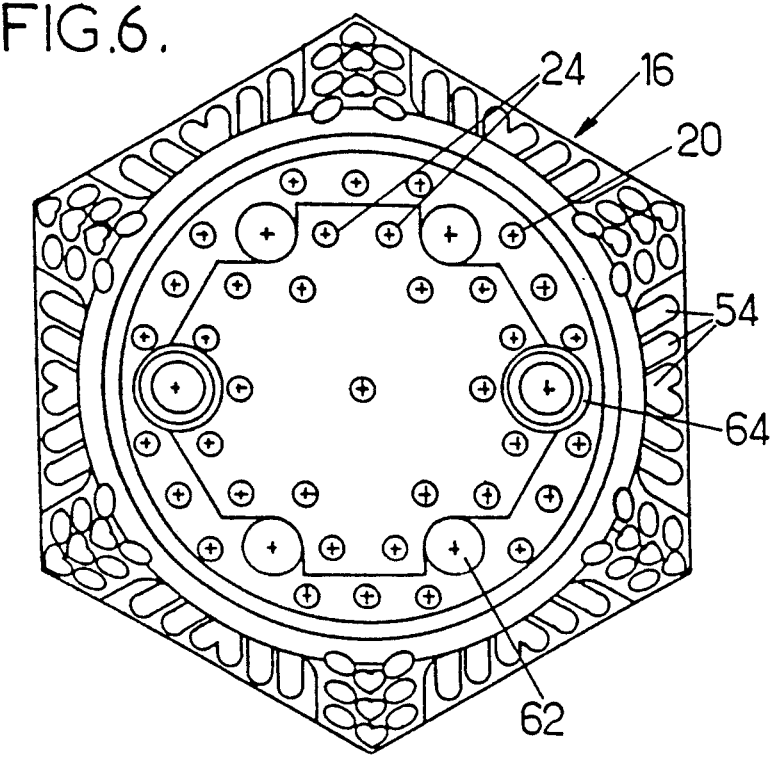

In the modified embodiment of FIGS. 5 and 6 (where the same, reference numbers are again used to designate the elements already described), guide rods 62 are secured to the adapter plate and slidably receive connecting plate 52. The latter i provided with tubular guides 64 for slidable engagement with centering studs (not shown) which then project from the lower surface of the upper core plate. The passages 54 are placed obliquely so as to have an increased cross-sectional area. The inner volume of the end piece is again supplied with coolant by the guide tubes 20 and 24 only.

The invention is also applicable to fuel assemblies with a unitary structure. Referring to FIG. 7, the upper end piece of such an assembly is arranged to be applied against the upper core plate 49 by springs (not shown) carried by the lower end piece and having a bearing abutment on the core support plate. The springs may be mounted in a manner known per se. The inner volume of the upper end piece is again supplied with coolant by the guide tubes only. All guide tubes are fixed to the adapter plate 46 and to the lower end piece.

The modified embodiment shown in FIG. 8 differs from that of FIG. 7 in that passages 60 are formed in the adapter plate 46 for delivering an additional coolant flow to the inner volume of the end piece 16 and, from there, to the respective cluster guide sleeve.

While, in the embodiment of FIGS. 7 and 8, there is no re-distribution of flow downstream of the adapter plate 46, mixing takes place to some extent if the assembly has a unitary structure forced downwardly and held in contact with the core support plate (not shown) by resilient means carried by the upper end piece. As shown in FIG. 9, the shroud 66 of the upper end piece 16 is shorter than the shroud 42 of the preceding embodiments. A helical spring 68 is compressed between adapter plate 46 and a ring 70 bearing against the upper core plate 49. This spring fulfils a so-called hold-down function. In FIG. 9, a first distribution of the coolant flow which has swept the fuel element in the assembly is achieved by passages 54 and 58 in the adapter plate 46, in the upstream portion of the upper end piece. Re-distribution takes place in the space between shroud 68 and ring 70. However, as compared with the preceding arrangements, the embodiment of FIG. 9 has the drawback that longitudinal expansion of the assemblies under irradiation, if it occurs, is likely to modify the flow distribution originally designed.

Numerous further modifications of construction are possible. Generally, the invention is applicable not only to unitary structures but also to structures made of several sub-structures, and not only to hexagonal assemblies but also to square assemblies.

We claim:

1. In a nuclear reactor having a core comprising a plurality of fuel assemblies and having upper internals including an upper core plate located above the core and a plurality of control cluster guide sleeves located above the upper core plate and each in axial alignment with a respective one of said fuel assemblies, said upper core plate being formed with passage means for an upward coolant flow from said core, a fuel assembly comprising:
   a bundle of fuel rods,
   a structure for holding said fuel rods in position, having an upper end piece, a lower end piece, a plurality of guide tubes connecting said upper end piece and lower end piece and each for slidably receiving an elongated element of a control cluster associated with the fuel assembly, and grids carried by some at least of said guide tubes for maintaining said fuel rods in a regular array,
   wherein said upper end piece has an adapter plate secured to some at least of said guide tubes and fast with an upwardly extending shroud for defining an inner volume communicating with the respective guide sleeve through the passage means, said adapter plate having an outer peripheral region which extends radially outward beyond the outer surface of said shroud,
   wherein all said guide tubes of the fuel assembly open into said inner volume, and
   wherein a plurality of coolant flow passages extend through said outer peripheral region of said adapter plate, each said control cluster guide sleeve having radial dimensions which are substantially the same as the radial dimensions of said shroud so that said control cluster guide sleeve is positioned above all of said guide tubes of said fuel assembly, said upper core plate having coolant flow passages extending therethrough between adjacent ones of said control cluster guide sleeves.

2. Fuel assembly according to claim 1, wherein the adapterplate is devoid of coolant flow means, other than the guide tubes of the fuel assembly, opening into said inner volume.

3. Fuel assembly according to claim 1, wherein said passage means in said upper core plate open into a respective one of said guide sleeves only, and wherein said inner volume of each one of said fuel assemblies communicates with one of said guide sleeves only.

4. In a nuclear reactor having a core comprising a plurality of fuel assemblies and having upper internals including an upper core plate located above the core and a plurality of guide sleeves located above the upper core plate and each in axial alignment with a respective one of said fuel assemblies, said upper core plates being formed with passage means for an upward coolant flow from said core into said upper internals, a fuel assembly comprising:
   a bundle of parallel fuel rods distributed at the nodal points of a regular array,
   a structure for holding said fuel rods in position, having an upper end piece, a lower end piece, a plurality of guide tubes replacing fuel rods at some of said nodal points, and grids carried by some of said guide tubes for maintaining said fuel rods in said regular array,
   wherein said structure consists of:
      a first sub-structure including said upper end piece, plate means movable within the lower end piece in a direction parallel to said fuel rods and said grids and said some guide tubes which are fastened to the plate means and the upper end piece,
      a second sub-structure which includes the lower end piece and the balance of the guide tubes fixed thereto,
   wherein resilient means are accommodated within the lower end piece and operatively cooperates with said lower end piece and said plate means for exerting a force biasing said end pieces apart and, forcing said upper end piece against the upper core plate,
   wherein said upper end piece includes an adapter plate secured to said some of said guide tubes and fast with an upwardly extending shroud for defining an inner volume communicating with the respective guide sleeve through the passage means in said upper core plate and receiving a coolant flow through all said guide tubes of the fuel assembly,
   wherein said adapter plate has an outer peripheral region which extends radially outward beyond the outer surface of said shroud, and
   wherein a plurality of coolant flow passages extend through said outer peripheral region of said adapter plate, each said control cluster guide sleeve having radial dimensions which are substantially the same as the radial dimensions of said shroud so that said control cluster guide sleeve is positioned above all of said guide tubes of said fuel assembly, said upper core plate having coolant flow passages extending therethrough between adjacent ones of said control cluster guide sleeves.

5. Fuel assembly according to claim 4, wherein the guide tubes of said second sub-structure are fixed to a plate received for vertical movement along the direction of said rods within said upper end piece and wherein said plate is arranged for receiving a spider of a control rod cluster upon fall of the latter into the fuel assembly.

6. Fuel assembly according to claim 5, wherein said plate is provided with centering studs arranged for sliding cooperation with recesses formed in the upper core plate.

7. Fuel assembly according to claim 5, wherein said adapter plate of said upper end piece is formed with additional passages opening into said inner volume and in that said plate is formed with openings substantially in alignment with said supplemental passages in the adapter plate.

8. Fuel assembly according to claim 4, wherein said guide tubes of said first sub-structure are located around the guide tubes of the second sub-structure.

9. Fuel assembly according to claim 1, wherein said structure is unitary and said fuel assembly includes resilient means for applying the shroud of the upper end piece in direct contact with the upper core plate.

10. Fuel assembly according to claim 1, wherein said structure is unitary and wherein said fuel assembly further includes a bearing ring and resilient hold down means for maintaining the lower end piece in contact with a lower core plate and said ring in contact with the lower surface of said upper core plate.

* * * * *